(12) United States Patent
Kakino et al.

(10) Patent No.: US 7,606,707 B2
(45) Date of Patent: Oct. 20, 2009

(54) SPEAKER RECOGNITION APPARATUS AND SPEAKER RECOGNITION METHOD TO ELIMINATE A TRADE-OFF RELATIONSHIP BETWEEN PHONOLOGICAL RESOLVING PERFORMANCE AND SPEAKER RESOLVING PERFORMANCE

(75) Inventors: Tomonari Kakino, Shizuoka (JP); Tomonori Ikumi, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 777 days.

(21) Appl. No.: 11/221,116

(22) Filed: Sep. 6, 2005

(65) Prior Publication Data

US 2007/0055516 A1  Mar. 8, 2007

(51) Int. Cl.
*G10L 17/00* (2006.01)
(52) U.S. Cl. ...................................... 704/246
(58) Field of Classification Search ............ 704/246
See application file for complete search history.

(56) References Cited

U.S. PATENT DOCUMENTS

| | | | | |
|---|---|---|---|---|
| 5,345,536 A | * | 9/1994 | Hoshimi et al. | 704/243 |
| 5,692,100 A | * | 11/1997 | Tsuboka et al. | 704/222 |
| 6,032,116 A | * | 2/2000 | Asghar et al. | 704/238 |
| 6,067,515 A | * | 5/2000 | Cong et al. | 704/243 |
| 6,070,136 A | * | 5/2000 | Cong et al. | 704/222 |
| 6,219,642 B1 | * | 4/2001 | Asghar et al. | 704/256.8 |
| 6,347,297 B1 | * | 2/2002 | Asghar et al. | 704/243 |
| 6,418,412 B1 | * | 7/2002 | Asghar et al. | 704/256.5 |
| 7,315,819 B2 | * | 1/2008 | Toguri et al. | 704/246 |
| 7,346,508 B2 | * | 3/2008 | Toguri et al. | 704/246 |

FOREIGN PATENT DOCUMENTS

JP 11-085182 3/1999

OTHER PUBLICATIONS

S. Furui; Speech Information Processing; 1$^{st}$ Edition, pp. 56-57, Morikita Shuppan Co., Ltd, Japan).
S. Furui; Speech Information Processing; 1$^{st}$ Edition, pp. 56-57, Morikita Shuppan Co., Ltd, Japan), Jun. 30, 1998.

* cited by examiner

*Primary Examiner*—Susan McFadden
(74) *Attorney, Agent, or Firm*—Frishauf, Holtz, Goodman & Chick, P.C.

(57) ABSTRACT

In a speaker distance calculation part of a speaker recognition apparatus, a quantization distance is obtained between a voice feature vector of a voice feature vector sequence produced from a voice of a speaker to be recognized and a representative vector of a codebook. The voice feature vector is quantized based on the quantization distance. And a quantization distortion is obtained by using a high order voice feature vector group of the voice feature vector sequence. In a recognition part of the speaker recognition apparatus, speaker recognition is executed based on the quantization distortion, which is for example, an average value of a plurality of the quantization distortions.

5 Claims, 5 Drawing Sheets

SPEAKER RECOGNITION APPARATUS AND SPEAKER RECOGNITION METHOD TO ELIMINATE A TRADE-OFF RELATIONSHIP BETWEEN PHONOLOGICAL RESOLVING PERFORMANCE AND SPEAKER RESOLVING PERFORMANCE

BACKGROUND OF THE INVENTION

1. Field of the Invention

The present invention relates to a speaker recognition apparatus, a computer program for speaker recognition, and a speaker recognition method, for recognizing a speaker by using personal information contained in a voice wave.

2. Description of the Related Art

A text-dependant speaker recognition apparatus, which recognizes a speaker based on a voice speaking predetermined contents, and a text-independent speaker recognition apparatus, which identifies a speaker based on a voice speaking any contents, have been proposed as speaker recognition apparatuses.

The speaker recognition apparatus, in general, converts an input voice wave into an analogue signal, converts the converted analogue signal into a digital signal, executes a discrete-analysis of the digital signal, and then produces a voice feature vector sequence which contains personal information. Here, a cepstrum coefficient is used as the voice feature vector. The speaker recognition apparatus, at a registration mode, clusters the voice feature vector sequence into a predetermined number of clusters, for example, thirty two clusters, and produces a representative vector, which is a centroid of each cluster (see Furui, "Speech Information Processing", $1^{st}$ ed, pp 56-57, Morikita Shuppan Co., Ltd, Japan). Further, the speaker recognition apparatus, in an identification mode, calculates a distance between the voice feature vector sequence produced from the input voice wave at the registration mode and a pre-registered codebook based on each voice feature vector, figures out an average value (an average distance), and identifies the speaker based on the average distance.

In the case where the speaker recognition apparatus is used as a speaker verification apparatus, a distance between the voice feature vector sequence produced from a speaker to be recognized and a codebook with respect to the speaker is calculated, and the distance and a threshold value are compared to execute speaker verification. In the case where the speaker recognition apparatus is used as a speaker identification apparatus, distances between the voice feature vector sequence produced from a speaker to be identified and codebooks of all registered speakers are calculated, and the shortest distance is selected from the plurality of distances corresponding to the registered speakers to execute speaker identification.

Currently, a cepstrum coefficient reflecting a shape of vocal tract, or a pitch indicating a vibrational frequency of a vocal band is commonly used as a voice feature amount. The information thereof contains phonological information indicating contents of speech, and personal information depending on a speaker. When a difference of the speaker's voice is calculated as a distance, it is not desirable to compare dispersion of the phonological information with dispersion of the personal information because the dispersion of the phonological information is broader than that of the personal information. Rather, it is desirable to compare the same phonological information. Therefore, according to an existing speaker recognition apparatus, approximate normalization by phonemes is executed by clustering of vector dispersion in observation space, and a speaker distance reflecting a personality, which is gained by a comparison of approximately the same phonemes, is calculated as a distortion amount.

When clustering the voice feature vector sequence, however, to which order the voice feature vector should be set is a problematic. In general, there is a large amount of phonological information existing in low orders, while large amount of personal information exists in high orders. Therefore, if the voice feature vector order is set to a low order in order to improve phonological resolving performance when clustering, the speaker resolving performance may be lowered. On the contrary, if the voice feature vector is set to a high order in order to raise the speaker resolving performance, the phonological resolving performance may be lowered. This gives rises to a trade-off relationship problem. Because of this problem, the voice feature vector order is currently set to a most appropriate order determined by an experimental method.

Accordingly, an object of the present invention is to eliminate the trade-off relationship between the phonological resolving performance and the speaker resolving performance, and is to realize precise speaker recognition.

SUMMARY OF THE INVENTION

According to one aspect of the present invention, a speaker recognition apparatus is provided in which a distance between voice feature vectors of a first voice feature vector sequence, which is produced from a voice of a speaker to be registered, is obtained based on a low order voice feature vector group of the first voice feature vector sequence. The first voice feature vector sequence is clustered based on the obtained distance, and a codebook including a plurality of representative vectors is produced and stored. A quantization distance between (a) each voice feature vector of a second voice feature vector sequence, which is produced from a voice of a speaker to be recognized, and (b) a corresponding one of the plurality of representative vectors stored in the codebook is obtained based on a low order voice feature vector group of the second voice feature vector sequence. Each voice feature vector of the second voice feature vector sequence is quantized based on the obtained quantization distance. And a quantization distortion between each voice feature vector of the second voice feature vector sequence and the corresponding one of the plurality of representative vectors stored in the codebook is obtained based on a high order voice feature vector group of the second feature vector sequence. Speaker recognition is executed based on the obtained quantization distortion.

According to another aspect of the present invention, a speaker recognition apparatus is provided in which a weighted vector distance, which is based on a first weight, is obtained between voice feature vectors of a first voice feature vector sequence produced from a voice of a speaker to be registered. The first voice feature vector sequence is clustered based on the obtained weighted vector distance, and a codebook including a plurality of representative vectors is produced and stored. A weighted quantization distance, which is based on a second weight, between corresponding ones of the plurality of representative vectors stored in the codebook and each voice feature vector of a second voice feature vector sequence produced from a voice of a speaker to be recognized is obtained. Each voice feature vector of the second voice feature vector sequence is quantized based on the obtained weighted quantization distance. And a weighted quantization distortion, which is based on a third weight which differs from the first weight and the second weight, between the corresponding ones of the plurality of representative vectors stored in the codebook and each voice feature vector of the second voice feature vector sequence is obtained. Speaker recognition is executed based on the quantization distortion.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
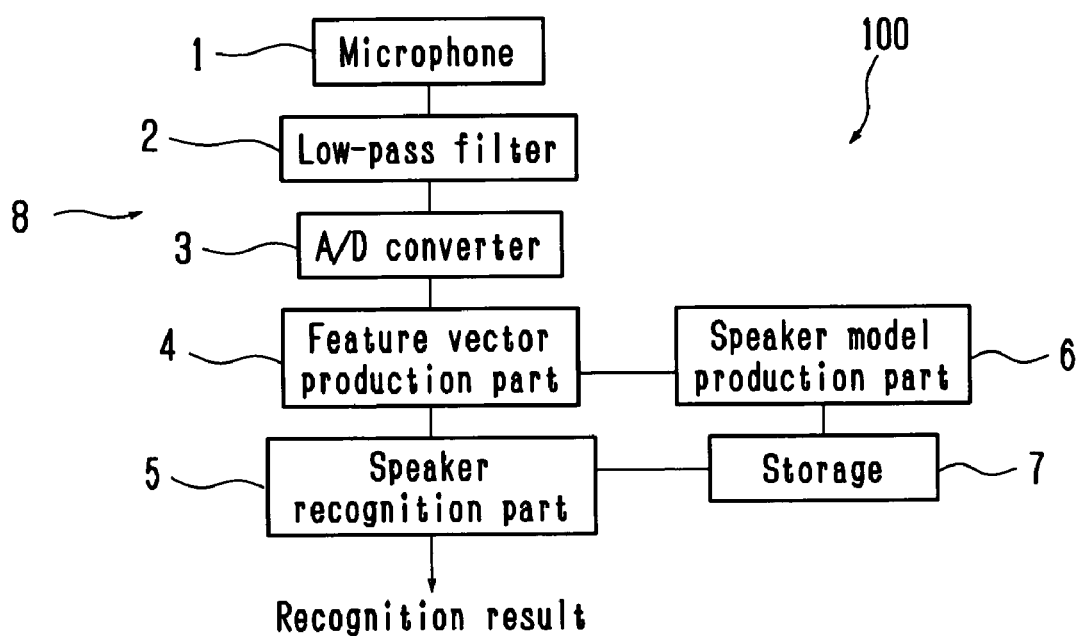
FIG. 1 is a block diagram showing a structure of a speaker recognition apparatus of the present invention.

The first embodiment of the present invention will be explained with reference to FIGS. 1 to 4. FIG. 1 is a block diagram showing a structure of a speaker recognition apparatus 100 of the first embodiment.

As shown in FIG. 1, the speaker recognition apparatus 100 contains a microphone 1, a low-pass filter 2, A/D converter 3, a feature vector production part 4, a speaker recognition part 5, a speaker model production part 6, and a storage section 7. With these parts and elements, various means (or steps) can be executed.

The microphone 1 converts an input voice into an electrical analogue signal. The low-pass filter 2 removes frequencies over a predetermined frequency from the input analogue signal. The A/D converter 3 converts the input analogue signal into a digital signal at a predetermined sampling frequency and a quantifying bit number. A voice input part 8 includes the microphone 1, the low-pass filter 2, and the A/D converter 3.

The feature vector production part 4 executes a discrete-analysis of the input digital signal and produces and outputs a M-order voice feature vector sequence (a feature parameter time series). Further, the feature vector production part 4 includes a switch (not shown) for selecting a registration mode and an identification mode. In accordance with the selected mode, the feature vector production part 4 electrically connects to the speaker model production part 6 in the registration mode and outputs the M-order voice feature vector sequence into the speaker production part 6, and the feature vector production part 4 electrically connects to the speaker recognition part 5 in the identification mode, and outputs the M-order voice feature vector sequence into the speaker recognition part 5. In this embodiment of the present invention, the M-order voice feature vector sequence is a 16-order voice feature vector sequence (M=16), and the feature vector includes 1 to 16-order LPC cepstrum coefficients, but is not limited to this example.

The speaker model production part 6 produces a codebook as a speaker model from the voice feature vector sequence produced at the feature vector production part 4 in the registration mode. The storage section 7 is a dictionary to store (register) the codebook produced at the speaker model production part 6.

The speaker recognition part 5 calculates a distance between the codebook stored in the storage section 7 in advance and the voice feature vector sequence produced at the feature vector production part 4, then recognizes the speaker based on the distance, and outputs a result as a speaker recognition result.

Next, the speaker model production part 6 will be described with reference to FIG. 2, which is a pattern diagram schematically showing a clustering to obtain a representative vector (a centroid) from a voice feature vector sequence.

Figure 2:
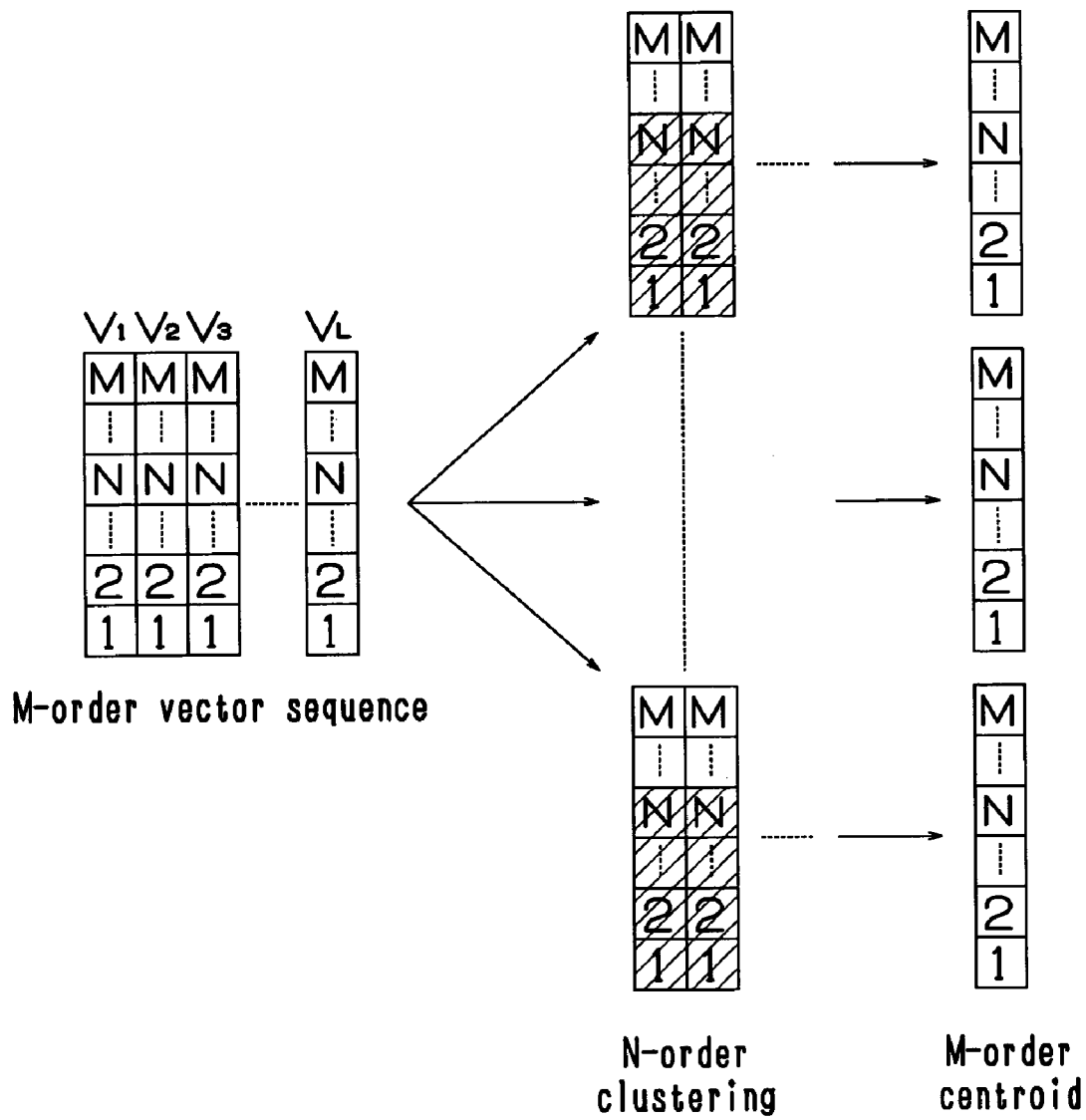
FIG. 2 is a pattern diagram schematically showing a clustering to obtain a representative vector from a voice feature vector sequence.

As shown in FIG. 2, the speaker model production part 6 clusters the M-order voice feature vector sequence, which is produced from a voice of a speaker to be registered at the feature vector production part 4 in the registration mode, into a number of clusters corresponding to a predetermined codebook size. The speaker model production part 6 then obtains, for each cluster, a centroid, which is a weighted center of the cluster, to be a representative vector for the cluster, and registers a plurality of representative vectors (a centroid for each cluster) to the storage section 7 (the dictionary) as codebook elements. The codebook is produced for every registered speaker.

Here, the clustering is executed by using a N-order (N<M) voice feature vector sequence (the shaded area of FIG. 2) of the M-order voice feature vector sequence, and the representative vector is obtained in M-order. The N-order voice feature vector sequence is of a low order voice feature vector group.

A vector distance D1 between the vectors used at the clustering can be obtained from the following formula (1). In this embodiment of the present invention, N=8, M=16, and the codebook size is 32.

$$D1 = \left[\sum_{k=1}^{N}(X_k - Y_k)^2\right]^{\frac{1}{2}} \quad (1)$$

That is, the speaker model production part 6 uses the N-order voice feature vector sequence of the M-order voice feature vector sequence produced at the feature vector production part 4 in the registration mode to obtain the vector distance D1 by the formula (1), then clusters the M-order voice feature vector sequence based on the obtained vector distance D1, and produces the codebook made up of a plurality of the M-order representative vectors.

Next, the speaker recognition part 5 will be explained with reference to FIG. 3, which is a block diagram showing the structure of the speaker recognition part 5.

Figure 3:
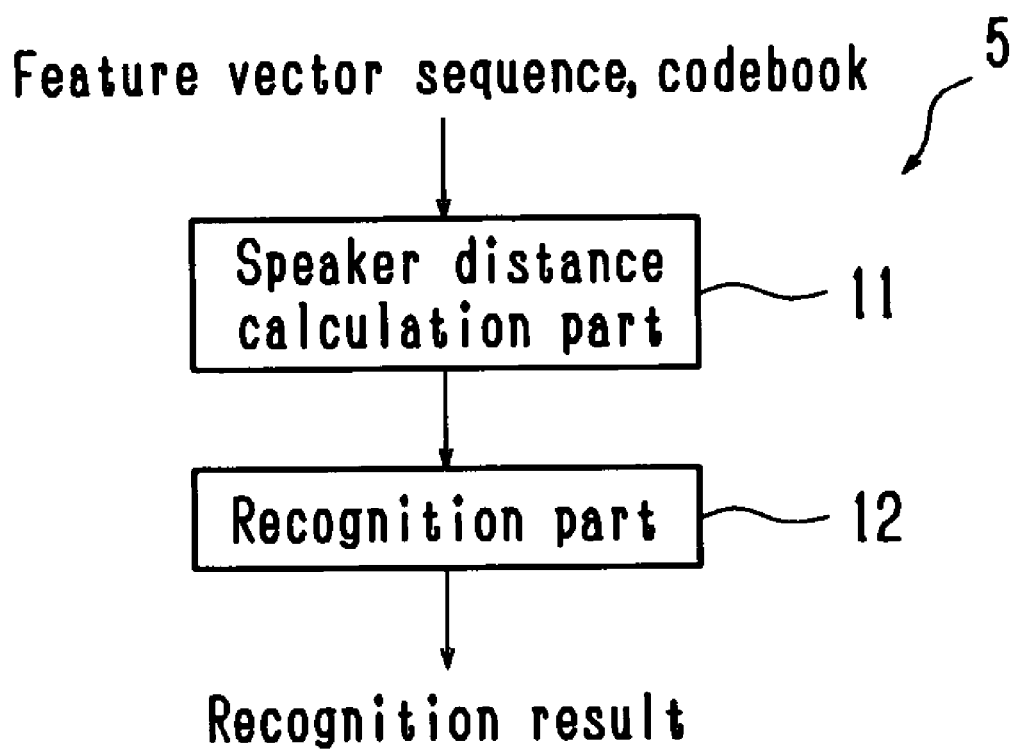
FIG. 3 is a block diagram showing a structure of a speaker recognition part provided in the speaker recognition apparatus.
Figure 4:
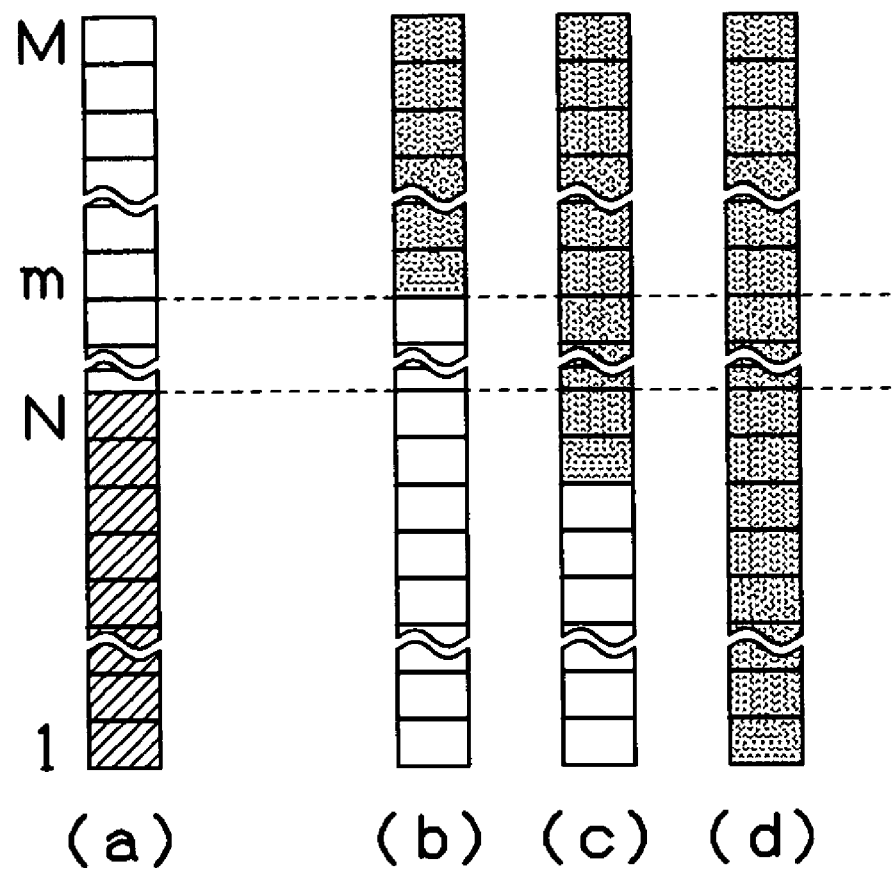
FIG. 4 is a pattern diagram showing a structure of a feature vector.

As shown in FIG. 3, the speaker recognition part 5 includes a speaker distance calculation part 11 and a recognition part 12.

The speaker distance calculation part 11 calculates a distance between the plurality of representative vectors stored in the codebook and the M-order voice feature vector sequence produced from the voice of the speaker to be recognized at the feature vector production part 4 (a distance between the codebook and the feature vector sequence). That is, the speaker distance calculation part 11 calculates a distance between the feature vector from the feature vector production part 4 and the representative vector of the codebook in the storage section 7 (a distance between the representative vector and the feature vector) for each feature vector of the M-order voice feature vector sequence produced at the feature vector production part 4.

Here, the distance between the codebook and the feature vector sequence can be obtained by: (a) quantizing each M-order voice feature vector of the voice feature vector sequence based on a quantization distance D2 between the representative vector and the feature vector that is calculated by using the N-order element and (b) by obtaining a distortion distance D3 (a quantization distortion) between the representative vector and the feature vector by using the M-order voice feature vector. Thus, the distance between the codebook and the feature vector sequence is calculated as an average value of the obtained quantization distortions. Here, the N-order voice feature vector sequence is of a low order voice feature vector group, and the M-order voice feature vector sequence is of a high order voice feature vector group.

The quantization distance D2 between the representative vector and the feature vector used in a quantization process can be obtained from the following formula (2), and the distortion distance D3 can be obtained from the following formula (3).

$$D2 = \left[\sum_{k=1}^{N}(C_k - X_k)^2\right]^{\frac{1}{2}} \quad (2)$$

$$D3 = \left[\sum_{k=1}^{M}(C_k - X_k)^2\right]^{\frac{1}{2}} \quad (3)$$

The speaker distance calculation part 11 obtains the quantization distance D2 from the formula (2). D2 is the quantization distance between the representative vector and the feature vector, that is, between each voice feature vector in the M-order voice feature vector sequence produced at the feature vector production part 4, and the plurality of representative vectors stored in the codebook in the storage section 7 in the registration mode. Then, a quantization of the M-order voice feature vector sequence is executed by using the N-order voice feature vector sequence based on the obtained quantization distance D2. That is, each voice feature vector of the M-order voice feature vector sequence is quantized. Then, the distortion distance D3 between the representative vector and the feature vector is calculated from the formula (3). D3 is the distortion distance between the plurality of representative vectors stored in the codebook in the storage section 7 and the M-order voice feature vector sequence produced at the feature vector production part 4.

In this embodiment, the quantization distortion is obtained by using the M-order voice feature vector sequence, but it is not limited to this example. For example, the quantization distortion can be obtained by using a voice feature vector sequence containing a (m to M)-order (N<m<M) voice feature vector sequence (high order voice feature vector sequence). The voice feature vector sequence containing the (m to M)-order (N<m<M) voice feature vector sequence should be of a high order voice feature vector group. The high order voice feature vector group would be high enough if it contains a high order voice feature vector sequence. The (m to M)-order (N<m<M) voice feature vector sequence could be any of the followings: a voice feature vector sequence including only a (m to M)-order cepstrum coefficient shown in the shaded area of (b) in FIG. 4; a voice feature vector sequence including the (m to M)-order cepstrum coefficient and one portion of a (1 to N)-order cepstrum coefficient shown in the shaded area of (c) in FIG. 4; or a voice feature vector sequence (M-order voice feature vector sequence) including (1 to M)-order cepstrum coefficient shown in the shaded area of (d) in FIG. 4. Here, the (1 to N)-order cepstrum coefficient (the shaded area of (a) in FIG. 4) is a low order cepstrum coefficient, and the (m to M)-order cepstrum coefficient is a high order cepstrum coefficient. The high order cepstrum coefficient contains more personal information than the low order cepstrum coefficient does, and the low order cepstrum coefficient contains more phonological information than the high order cepstrum coefficient does. In this embodiment, N=8 and M=16, but it is not limited to these values.

The recognition part 12 recognizes the speaker based on an average value of the quantization distortions obtained at the speaker distance calculation part 11 and outputs a recognition result as a speaker recognition result. When the speaker recognition apparatus 100 is used as a speaker verification apparatus, the speaker distance calculation part 11 calculates a distance between the voice feature vector sequence produced from a voice of a speaker to be recognized and a plurality of representative vectors stored in the codebook of the speaker to be recognized (an average value of the quantization distortions). The recognition part 12 recognizes the speaker by comparing the distance with a threshold. Further, when the speaker recognition apparatus 100 is used as a speaker identification apparatus, the speaker distance calculation part 11 calculates distances between the voice feature vector sequence produced from a voice of the speaker to be recognized and the plurality of representative vectors stored in the codebook of all the registered speakers, and then recognizes the speaker by selecting the shortest distance from the plurality of distances.

According to the first embodiment of the present invention, in the registration mode, the vector to vector distance of each voice feature vector D1 can be obtained by using N-order vector element in the M-order voice feature vector sequence produced from a voice of the speaker to be registered in the registration mode. The M-order voice feature vector sequence is clustered based on the vector distance D1, and the codebook made up of plural M-order centroids is produced. In addition, in the identification mode, each voice feature vector of the M-order voice feature vector sequence is quantized based on the quantization distance D2 between each M-order voice feature vector produced from a voice of the speaker to be recognized and the N-order vector element of each representative vector of the codebook, the distortion distance D3 using the M-order vector element is obtained, and speaker recognition is executed based on the average value of the quantization distortions. With the above structure, a trade-off relationship between phonological resolving performance and speaker resolving performance can be eliminated, and a good balance thereof can be ensured. As a result, highly precise speaker recognition can be realized.

In this embodiment of the present invention, the first voice feature vector sequence produced from a voice of the speaker to be registered and the second voice feature vector sequence produced from a voice of the speaker to be recognized are both the M-order voice feature vector sequences, the low order voice feature vector group is a N-order (N<M) voice feature vector sequence, the codebook includes the M-order representative vector, and the high order voice feature vector group is the M-order voice feature vector sequence. Thus, a stable recognition performance can be ensured with certainty.

Alternatively, according to this embodiment of the present invention, the first voice feature vector sequence and the second voice feature vector sequence are both the M-order voice feature vector sequence, the low order voice feature vector group is the N-order (N<M) voice feature vector sequence, the codebook includes the M-order representative vector, and the high order voice feature vector group is the voice feature vector sequence containing a (m to M)-order (N<m<M) voice feature vector sequence. Thus, a stable recognition performance can be ensured with more certainty.

The second embodiment of the present invention will now be explained. The second embodiment is a modification of the speaker recognition part 5 and the speaker model production part 6 of the first embodiment of the present invention. Thus the same configuration of the parts appearing in the second embodiment will be referred to with the same reference numbers as in the first embodiment and an explanation thereof except for the speaker recognition part 5 and the speaker model production part 6 will be omitted.

The speaker model production part 6 according to the second embodiment will be explained with reference to FIG. 2. The speaker model production part 6 clusters a M-order voice feature vector sequence, which is produced from a voice of the speaker to be registered at the feature vector production part 4 in the registration mode, into a number of clusters corresponding to a predetermined codebook size, obtains a centroid as a weighted center of each cluster to make the centroid a representative vector for the cluster, and registers a plurality of representative vectors to the storage section (dictionary) 7 as a codebook. The codebook is produced for each registered speaker.

Here, the clustering is executed by using the M-order voice feature vector sequence, and the representative vector is obtained in M-order. The weighted vector distance D1 between the vectors used at the clustering can be obtained from the following formula (4). In this embodiment, N=8, M=16 and the codebook size is 32.

$$D1 = \left[\sum_{k=1}^{M} U_k (X_k - Y_k)^2\right]^{\frac{1}{2}} \tag{4}$$

The speaker model production part 6 obtains each weighted vector distance D1 by the formula (4) using the M-order voice feature vector sequence produced at the feature vector production part 4, clusters the M-order voice feature vector sequence based on the obtained weighted vector distance D1, and produces the codebook made up of the plurality of M-order representative vectors.

Next, the speaker recognition part 5 according to the second embodiment will be explained (see FIG. 3). The speaker recognition part 5 basically has a similar configuration to the first embodiment, and includes the speaker distance calculation part 11 and the recognition part 12.

The speaker distance calculation part 11 calculates a distance between the plurality of representative vectors stored in the codebook in the storage section 7 and the M-order voice feature vector sequence produced from a voice of the speaker to be recognized at the feature vector production part 4 (a distance between the codebook and the feature vector sequence). That is, the speaker distance calculation part 11 calculates the distance between the feature vector and the representative vector of the codebook (the distances between the representative vector and the feature vector) for each feature vector of the M-order voice feature vector sequence produced at the feature vector production part 4.

Here, the distance between the codebook and the feature vector is obtained as an average value of quantization distortions by quantizing each M-order voice feature vector of the voice feature vector sequence based on a weight quantization distance D2, and then by obtaining a weighted distortion distance D3 (a quantization distortion) of the distance between the representative vector and the feature vector by using the M-order voice feature vector.

According to the second embodiment, the weighted quantization distance D2 of the representative vector and the feature vector used at the quantization can be obtained from the following formula (5), and the weighted distortion distance D3 used for obtaining the quantization distortion can be obtained from the following formula (6).

$$D2 = \left[\sum_{k=1}^{M} U_k (C_k - X_k)^2\right]^{\frac{1}{2}} \tag{5}$$

$$D3 = \left[\sum_{k=1}^{M} V_k (C_k - X_k)^2\right]^{\frac{1}{2}} \tag{6}$$

Thus, the speaker distance calculation part 11 obtains the weighted quantization distance D2 between the representative vector and the feature vector by the formula (5), which is the distance between the plurality of representative vectors stored in the codebook in the storage section 7 in the recognition mode and each voice feature vector in the M-order voice feature vector sequence produced at the feature vector production part 4. Then, a quantization of the M-order voice feature vector sequence is executed based on the obtained weighted quantization distance D2. That is, each voice feature vector of the M-order voice feature vector sequence is quantized, the weighted distortion distance D3 between the plurality of representative vectors stored in the codebook in the storage section 7 and each voice feature vector of the M-order voice feature vector sequence produced at the feature vector production part 4 is obtained by the formula (6), and an average value of the obtained weighted distortion distance D3 (an average value of the quantization distortions) is obtained.

The recognition part 12 recognizes the speaker based on the average value of the quantization distortions obtained at the speaker distance calculation part 11, and outputs a recognition result as a speaker recognition result. When the speaker recognition apparatus 100 is used as a speaker verification apparatus, the speaker distance calculation part 11 calculates the distance between the voice feature vector sequence produced from a voice of the speaker to be recognized and the plurality of representative vectors stored in the codebook of the speaker to be recognized, and the recognition part 12 verifies the speaker by comparing the distance and a threshold value. Further, when the speaker recognition apparatus 100 is used as a speaker identification apparatus, the speaker distance calculation part 11 calculates distances (an average value of quantization distortions) between the voice feature vector produced from a voice of the speaker to be recognized and the plurality of representative vectors stored in the codebook of all registered speakers and identifies the speaker by selecting the shortest distance from the obtained distances.

According to the second embodiment of the present invention as explained above, in the registration mode, the weighted vector to vector distance D1 of each vector of the M-order voice feature vector sequence produced from a voice of the speaker to be registered is obtained, the M-order voice feature vector sequence is clustered based on the obtained weighted vector distance D1, and the codebook including a plurality of M-order representative vectors is produced. In the identification mode, each voice feature vector is quantized based on the weighted quantization distance D2 between each voice feature vector of the M-order voice feature vector sequence produced from a voice of the speaker to be recognized and each representative vector of the codebook, the quantization distortion is obtained by using the M-order voice feature vector sequence based on the distortion distance D3, and then the speaker recognition is executed based on an average value of the quantization distortions. With the above structure, a trade-off relationship between phonological resolving performance and speaker resolving performance can be eliminated, and a good balance thereof can be ensured. As a result, highly precise speaker recognition can be realized.

In the second embodiment of the present invention, the formulas (4), (5) and (6) are used, but it is not limited to these formulas. For example, the formula (4) can be replaced to the following formula (7) (weight: $U_k=1$), the formula (5) can be replaced to the following formula (8) (weight: $U_k=1$), and the formula (6) can be replaced to the following formula (9) (weight: $V_k=1/S_k$). Here, a standard deviation $S_k$ as a dispersal value by each voice feature vector is obtained statistically in advance.

$$D1 = \left[\sum_{k=1}^{M} U_k (X_k - Y_k)^2\right]^{\frac{1}{2}} \quad (7)$$

$$D2 = \left[\sum_{k=1}^{M} U_k (C_k - X_k)^2\right]^{\frac{1}{2}} \quad (8)$$

$$D3 = \left[\sum_{k=1}^{M} V_k (C_k - X_k)^2\right]^{\frac{1}{2}} \quad (9)$$

In the second embodiment of the present invention, the first voice feature vector sequence produced from a voice of the speaker to be registered and the second voice feature vector sequence produced from a voice of the speaker to be recognized are both M-order voice feature vector sequences. The weighted vector distance and the weighted quantization distance are respectively obtained by using a weight which meets the following relation, $U_k=1 (k \leq N)$, $0 (k>N)$, where $N<M$.

Here, $U_k$ is the first weight and the second weight. The weighted distortion distance can be obtained by using a weight which meets the following relation, $V_k=1 (k \leq M)$, where the third weight is $V_k$.

Thus, highly precise recognition performance can be realized.

Alternatively, in the second embodiment of the present invention, the first voice feature vector sequence and the second voice feature vector sequence are both M-order order voice feature vector sequences. The weighted vector distance and the weighted quantization distance are respectively obtained by using a weight which meets the following relation, $U_k=1 (k \leq M)$ Here, $U_k$ is the first weight and the second weight. The weighted distortion distance can be obtained by using a weight which meets the following relation, $V_k=1/S_k (k \leq M)$, where the third weight is $V_K$.

Thus, highly precise recognition performance can be realized.

Figure 5:
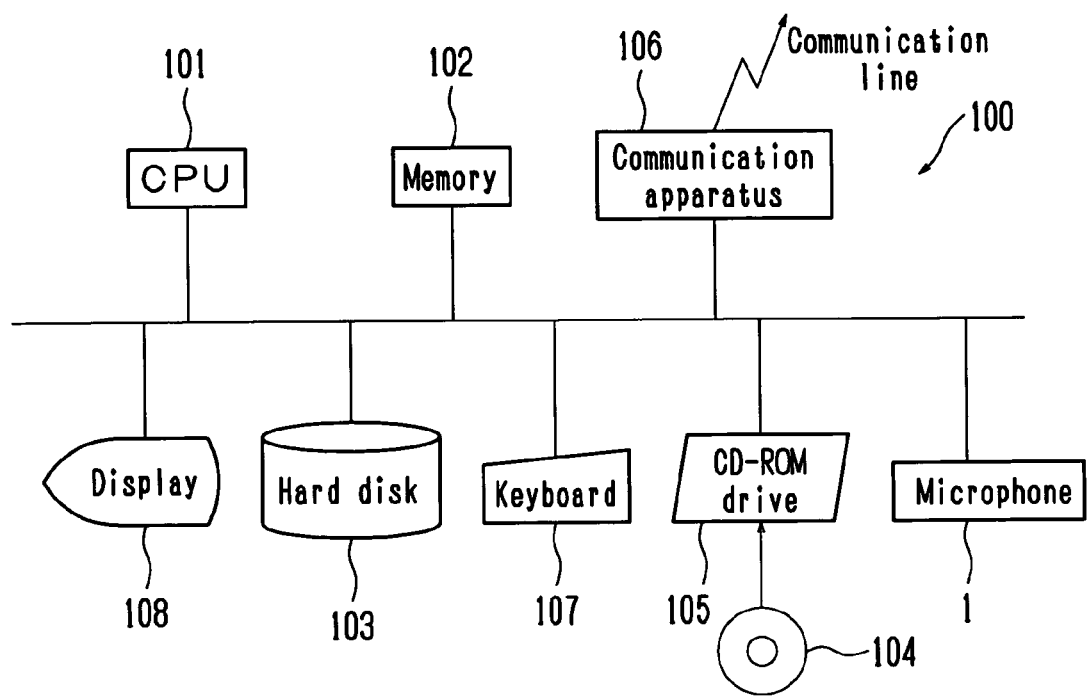
FIG. 5 is a block diagram showing an example structure of the speaker recognition apparatus of the present invention realized by software.

The hardware structure is not limited to the specific structure as explained above, and it can be realized by software. The speaker recognition part 5 or the speaker model production part 6 can be realized by software. FIG. 5 is a block diagram showing the speaker recognition apparatus 100 which is realized by software.

As shown in FIG. 5, the speaker recognition apparatus 100 contains a CPU 101, which is bus-connected to a ROM storing BIOS and so on, and a memory 102, which contains a ROM and a RAM to make up a microcomputer. The CPU 101 is bus-connected through I/O (not shown) to a HDD 103, a CD-ROM drive 105, which reads a computer readable CD-ROM 104, a communication apparatus 106, which communicates with the internet and so on, a keyboard 107, a display 108 such as a CRT or a LCD, and a microphone 1.

The CD-ROM 104 as a computer readable storage medium stores programs which realize the speaker recognition function of the present invention, and the CPU 101 can realize the speaker recognition function of the present invention by installing the programs. Further, a voice input through the microphone 1 is stored in the HDD 103 and so on. Then, when the programs run, voice data stored in the HDD 103, and so on, are read to execute a speaker recognition process. The speaker recognition process realizes similar functions to each part of the feature vector production part 4, the speaker recognition part 5 and the speaker production part 6 and so on, so that a similar effect as described above can be obtained.

For the storage medium, various optical disks such as a DVD, various optical magnetic disks, various magnetic disks such as a flexible disk, a semiconductor memory, and so on can be used. Further, the present invention can be realized by downloading programs from a network like the internet and installing the program to the HDD 103 as a storage section. In this case, a storage device which stores the programs at a server of a transmitting end becomes a storage medium of the present invention. The programs can operate on a given OS (an Operating System), and in that case, the programs can allow the OS to execute some part of the processes as described above, and the programs can be a part of a group of program files including prescribed application software such as a word processor software, or an OS, and so on.

Obviously, numerous modifications and variations of the present invention are possible in light of the above teachings. It is therefore to be understood that within the scope of the appended claims, the invention may be practiced otherwise than as specifically described herein.

What is claimed is:

1. A speaker recognition apparatus comprising:

means for obtaining a weighted vector distance, which is based on a first weight, between voice feature vectors of a first voice feature vector sequence produced from a voice of a speaker to be registered, for clustering the first voice feature vector sequence based on the obtained weighted vector distance, and for producing a codebook including a plurality of representative vectors;

means for storing the produced codebook;

means for obtaining a weighted quantization distance, which is based on a second weight, between corresponding ones of the plurality of representative vectors stored in the codebook and each voice feature vector of a second voice feature vector sequence produced from a voice of a speaker to be recognized, for quantizing each said voice feature vector of the second voice feature vector sequence based on the obtained weighted quantization distance, and for obtaining a weighted quantization distortion, which is based on a third weight which differs from the first weight and the second weight, between the corresponding ones of the plurality of representative vectors stored in the codebook and each said voice feature vector of the second voice feature vector sequence; and means for executing speaker recognition based on the quantization distortion.

2. The speaker recognition apparatus according to claim 1, wherein each of the first voice feature vector sequence and the second voice feature vector sequence is a M-order voice feature vector sequence;

wherein both the first weight of the weighted vector distance and the second weight of the weighted quantization distance are $U_K$, where:

$U_K=1$ (k≦N), 0 (k>N), and

N<M; and wherein the third weight of the weighted distortion distance is $V_K$, where:

$V_K=1$ (k≦M).

3. The speaker recognition apparatus according to claim 1, wherein each of the first voice feature vector sequence and the second voice feature vector sequence is a M-order voice feature vector sequence;

wherein both the first weight of the weighted vector distance and the second weight of the weighted quantization distance are $U_K$, where:

$U_K=1$ (k≦M); and wherein the third weight of the weighted distortion distance is $V_{K, where}$:

$V_K=1/S_K$ (k≦M), and a dispersal value by every M-order is $S_K$.

4. A speaker recognition method for a speaker recognition apparatus, the method comprising:

obtaining a weighted vector distance, which is based on a first weight, between voice feature vectors of a first voice feature vector sequence produced from a voice of a speaker to be registered, clustering the first voice feature vector sequence based on the obtained weighted vector distance, and producing a codebook including a plurality of representative vectors, by a speaker model production part of the apparatus;

storing the produced codebook in a storage section of the apparatus;

obtaining a weighted quantization distance, which is based on a second weight, between corresponding ones of the plurality of representative vectors stored in the codebook and each voice feature vector of a second voice feature vector sequence produced from a voice of a speaker to be recognized, quantizing each said voice feature vector of the second voice feature vector sequence based on the obtained weighted quantization distance, and obtaining a weighted quantization distortion, which is based on a third weight which differs from the first weight and the second weight, between the corresponding ones of the plurality of representative vectors stored in the codebook and each said voice feature vector of the second voice feature vector sequence, by a speaker distance calculation part of the apparatus; and executing speaker recognition based on the obtained quantization distortion, by a recognition part of the apparatus.

5. A computer readable storage medium having a program stored thereon that is executable by a computer to cause the computer to perform a speaker recognition process comprising:

obtaining a weighted vector distance, which is based on a first weight, between voice feature vectors of a first voice feature vector sequence produced from a voice of a speaker to be registered, clustering the first voice feature vector sequence based on the obtained weighted vector distance, and producing a codebook including a plurality of representative vectors;

storing the produced codebook;

obtaining a weighted quantization distance, which is based on a second weight, between corresponding ones of the plurality of representative vectors stored in the codebook and each voice feature vector of a second voice feature vector sequence produced from a voice of a speaker to be recognized, quantizing each said voice feature vector of the second voice feature vector sequence based on the obtained weighted quantization distance, and obtaining a weighted quantization distortion, which is based on a third weight which differs from the first weight and the second weight, between the corresponding ones of the plurality of representative vectors stored in the codebook and each said voice feature vector of the second voice feature vector sequence; and executing speaker recognition based on the obtained quantization distortion.

* * * * *